United States Patent
Markus et al.

(10) Patent No.: US 11,061,232 B2
(45) Date of Patent: Jul. 13, 2021

(54) METHOD AND APPARATUS FOR AN IMAGING LENS

(71) Applicants: David T. Markus, Irvine, CA (US); Michael C. Hayes, Irvine, CA (US)

(72) Inventors: David T. Markus, Irvine, CA (US); Michael C. Hayes, Irvine, CA (US)

(*) Notice: Subject to any disclaimer, the term of this patent is extended or adjusted under 35 U.S.C. 154(b) by 646 days.

(21) Appl. No.: 15/564,197

(22) PCT Filed: Apr. 4, 2016

(86) PCT No.: PCT/US2016/025947
§ 371 (c)(1),
(2) Date: Oct. 3, 2017

(87) PCT Pub. No.: WO2016/161463
PCT Pub. Date: Oct. 6, 2016

(65) Prior Publication Data
US 2018/0129049 A1  May 10, 2018

Related U.S. Application Data

(60) Provisional application No. 62/142,898, filed on Apr. 3, 2015.

(51) Int. Cl.
| | |
|---|---|
| *G03H 1/00* | (2006.01) |
| *G02B 27/01* | (2006.01) |
| *G02C 7/04* | (2006.01) |
| *G02B 3/00* | (2006.01) |
| *G02B 6/24* | (2006.01) |
| *G02C 7/02* | (2006.01) |

(52) U.S. Cl.
CPC ....... *G02B 27/0172* (2013.01); *G02B 3/0087* (2013.01); *G02B 6/24* (2013.01); *G02C 7/022* (2013.01); *G02C 7/04* (2013.01); *G02B 27/0101* (2013.01); *G02B 2027/0178* (2013.01)

(58) Field of Classification Search
CPC . G02C 7/00; G02C 7/02; G02C 7/022; G02C 7/04; G02C 7/049; G02C 2202/10; G02C 2202/12; G02B 3/00; G02B 3/0087; G02B 6/24; G02B 27/01; G02B 27/0101; G02B 27/017; G02B 27/0172; G02B 2027/0178; A61F 9/00; A61F 9/08; A61F 9/0017
USPC .......................................................... 359/13
See application file for complete search history.

(56) References Cited

U.S. PATENT DOCUMENTS

| | | | | |
|---|---|---|---|---|
| 3,658,407 A | * | 4/1972 | Kitano | G02B 3/0056 385/116 |
| 4,331,380 A | * | 5/1982 | Rees | G02B 3/00 355/1 |
| 2002/0150333 A1 | * | 10/2002 | Reed | G02B 6/3582 385/34 |

(Continued)

*Primary Examiner* — Stephone B Allen
*Assistant Examiner* — Jyotsna V Dabbi
(74) *Attorney, Agent, or Firm* — Kafantaris Law Offices; Theo Kafantaris

(57) ABSTRACT

A method and apparatus projecting an image or series of images onto the retina. Furthermore, the method and apparatus are neither cumbersome nor obstructive to the user. This is accomplished by embedding an imaging lens on the perimeter of the contact lens adapted to project an image inward toward the center of the contact lens, wherein the projected light will then be redirected onto the retina.

8 Claims, 3 Drawing Sheets

(56) References Cited

U.S. PATENT DOCUMENTS

| | | | | |
|---|---|---|---|---|
| 2004/0252940 A1* | 12/2004 | Atac | ............... | G02B 27/0172 385/31 |
| 2006/0226226 A1* | 10/2006 | Asai | ............... | G02B 26/101 235/454 |
| 2012/0086623 A1* | 4/2012 | Takagi | ............... | G02B 27/0172 345/7 |
| 2015/0205126 A1* | 7/2015 | Schowengerdt | ......... | G02B 5/20 345/633 |

* cited by examiner

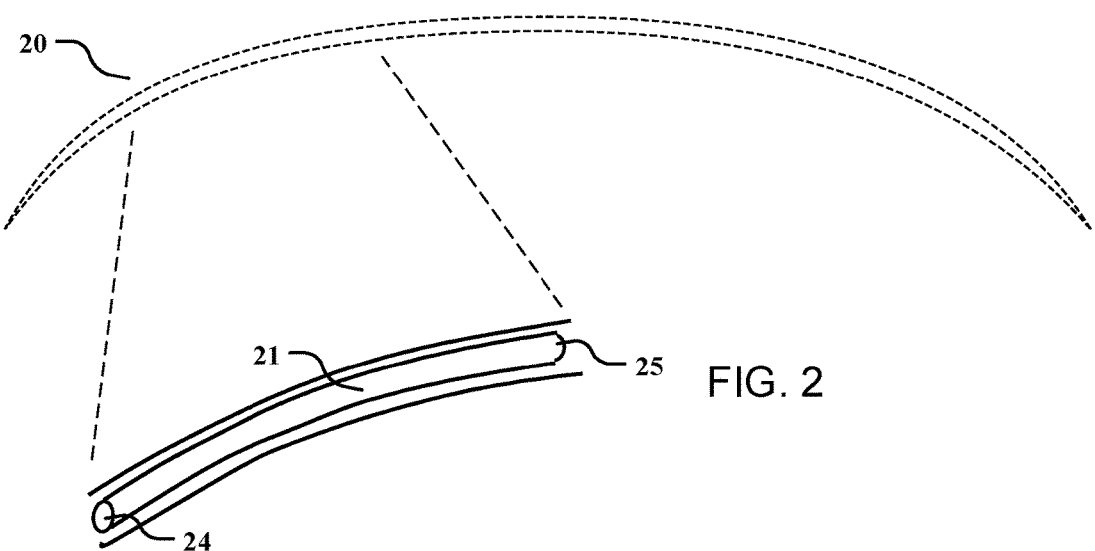
FIG. 2
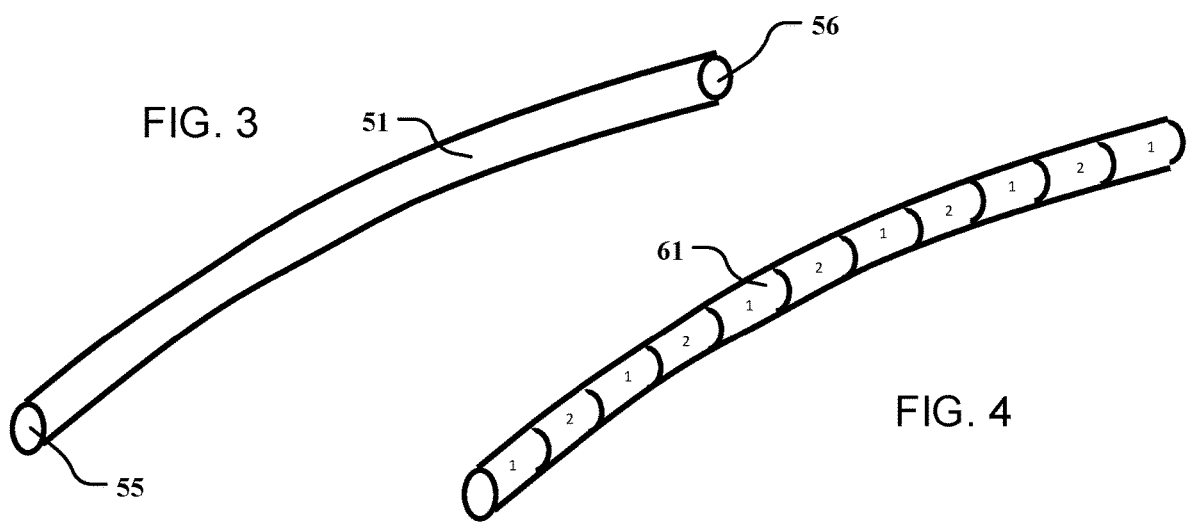
FIG. 3
FIG. 4
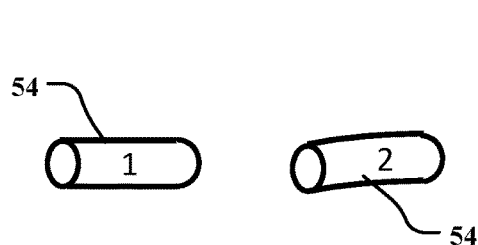
FIG. 5
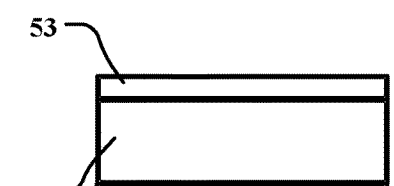
FIG. 6

METHOD AND APPARATUS FOR AN IMAGING LENS

CROSS-REFERENCE TO RELATED APPLICATIONS

This application claims the benefit of PCT/US16/25947, filed on Apr. 4, 2016, which claims the benefit of U.S. Provisional Patent Application No. 62/142,898, filed on Apr. 3, 2015, both of which are incorporated herein by reference.

STATEMENT REGARDING FEDERALLY SPONSORED RESEARCH AND DEVELOPMENT

Not Applicable.

FIELD OF THE INVENTION

This invention relates generally to an imaging lens, and more particularly, to a method and apparatus for projecting an image onto an elastic lens.

DISCUSSION OF RELATED ART

A lens can generally be described as a device made from glass or other transparent material adapted to refract light. Generally, lenses have fixed focal properties and are manufactured for specific purposes. For example, eyeglasses and contact lenses are examples of lenses adapted to provide vision correction by converging the light onto the eyes. A magnifying glass is an example of a lens adapted to enlarge a target area visually by converging the light passing through the area into a beam. Telescopes, cameras, microscopes, and projectors all utilize lenses to provide their utility.

Image projection can generally be described as optically projecting an image from one location to another. One primary example of image projection is a video or movie projector, where light is passed through a moving reel of image negatives, through a lens, and onto a flat surface, where the projected images are enlarged and displayed. Generally, image projection utilizes a lens, although images may be directly projected onto a surface using lasers. Furthermore, while image projection traditionally utilizes a projection surface, retinal projectors are adapted to project an image directly onto the retina of the eye.

A heads-up display, or HUD, can generally be described as a display that provides useful information for the user without obstructing their view. HUDs are typically projected onto the user's field of view and are commonly found in aircraft, automobiles, military vehicles, and other applications where useful information can be presented to the viewer near or relating to objects in their field of view.

Contact lenses are generally thin and light devices adapted to temporarily attach to the eyes for providing refractive error correction. There are two common types of contact lenses, hard lenses and soft lenses. Soft lenses are typically made from hydrogel or silicone hydrogel, which allow them to expand and contract, making them more comfortable for daily use. Benefits to lens wearers associated with silicone hydrogel contact lenses can be attributed, at least in part, to the combination of hydrophilic components and the hydrophobic properties of silicon-containing polymeric materials of the contact lenses.

While current contact lenses are adapted to provide vision correction, there is currently no method or device for adaptively projecting an image onto the retina using a contact lens. Current retinal projectors instead project an image onto the retina by positioning a light source in front of the eye through glasses or goggles, which are cumbersome and obstruct the vision of the user. Therefore, there is a continued need for a device for a contact lens adapted to project an image or series of images onto the retina that is neither cumbersome nor obstructive to the user. The present invention satisfies these needs.

SUMMARY OF THE INVENTION

The present invention is a method and apparatus projecting an image or series of images onto the retina. Furthermore, the present invention is neither cumbersome nor obstructive to the user. This is accomplished by embedding an imaging lens on the perimeter of the contact lens configured to project an image inward toward the center of the contact lens, wherein the projected light will then be redirected onto the retina.

Specifically, the present invention discloses a method and apparatus for projecting an image onto the retina through an optical system positioned on the perimeter of the contact lens. Furthermore, the present invention requires low power, can be adjusted quickly, and may be incorporated into the elastic material of a contact lens. This is accomplished by utilizing one or a plurality of lenses to project the image or series of images inward. The projected image or series of images will then be redirected to the retina such that the user may view the image clearly without obstruction. The peripheral lenses may comprise fiber optics with or without cladding, and a prism may be used to redirect the image onto the retina.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DESCRIPTION OF THE DRAWINGS

FIG. 2 is a diagram illustrating a detailed view of the cross-sectional view of FIG. 1;

FIG. 3 is a diagram illustrating the imaging lens;

FIG. 4 is a diagram illustrating a curved composite gradient index lens array;

FIG. 5 is a diagram illustrating the segments of the curved composite gradient index lens array;

FIG. 6 is a diagram illustrating a cross-sectional view of the imaging lens.

DETAILED DESCRIPTION OF THE PREFERRED EMBODIMENT

Figure 1:
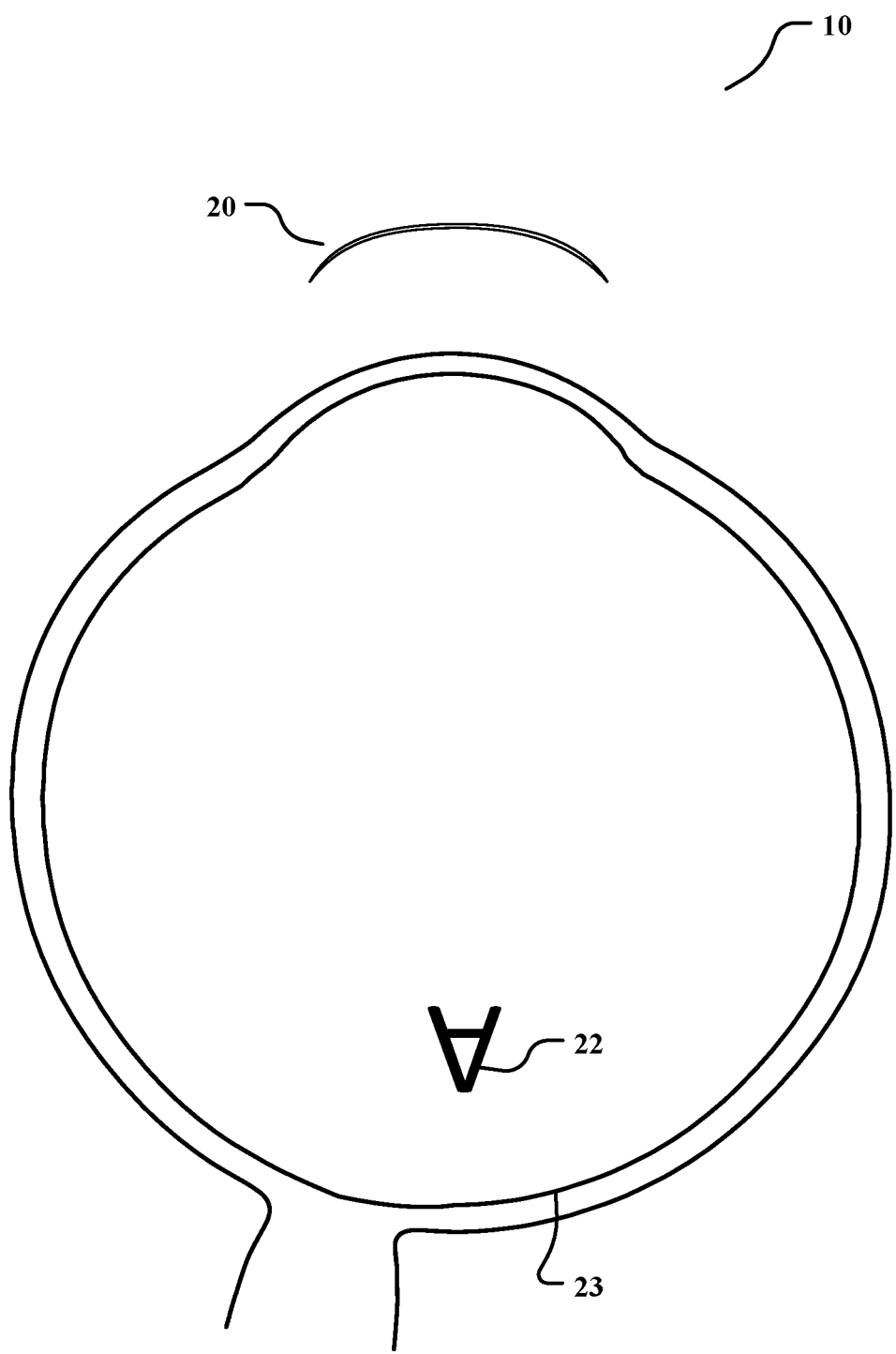
FIG. 1 is a diagram illustrating a cross-sectional view of a contact lens positioned near a human eye.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The present invention 10 discloses a method and apparatus adapted to project an image 22 onto a retina 23. Specifically, the present invention 10 discloses a method and apparatus for utilizing an imaging lens 21 on the perimeter of a contact lens 20 for projecting an image 22 onto one or a plurality of prisms 41, which will redirect the projected image 22 onto the retina 23. The present invention 10 is configured to focus a projected image 22, enlarge said image 22, and redirect said image 22 into the field of view of the user. Furthermore, the present invention 10 requires low power, can be adjusted quickly, and may be incorporated into the elastic material of a contact lens 20. This is accomplished by utilizing a display projector 31, one or a plurality of prisms 41, and an imaging lens 21 to carry an image 22 from a proximal end 24 to a distal end 25 for redirection into the retina 23. The imaging lens 21 will magnify and focus the image 22, modifying the refractive power and focal length of the light passing through it.

The imaging lens 21 is configured to carry light from a proximal end 24 to a distal end 25 while maintaining a curved structure. In the preferred embodiment, the imaging lens 21 comprises a self-focusing flat-end gradient optical lens (SELFOC). SELFOC imaging lenses are commonly used as an objective lens for small diameter imaging systems, where conventional lenses are not suitable due to size limitations. The imaging lens 21 here is configured to gather light from an object and form an inverted image at the back surface of the lens.

Typical SELFOC imaging lens applications include fiberscope and rigid endoscope. SELFOC imaging lenses are specified somewhat differently than SELFOC Micro Lenses (SML). While SML performance is controlled through the lens pitch and gradient constant ($\sqrt{A}$), SELFOC imaging lens performance is controlled via the working distance (WD) and image quality factors such as resolution and field curvature. For this reason, ILW and ILH lenses can consistently exhibit good image quality despite variations in $\sqrt{A}$ and/or Z (lens length).

FIG. 1 illustrates the imaging lens 21 incorporated within a contact lens 20. In the preferred embodiment, the imaging lens 21 will be positioned on the outer perimeter of the contact lens 20, outside of the field of view of the user. While typical SELFOC lenses do not bend, the imaging lens 21 presented here will comprise optical fiber 51 adapted to transmit light between its proximal 55 and distal 56 ends. Through optical fiber 51, the present invention 10 may still be used in contact lenses 20, where flexible and transparent materials must be used. The total diameter of the optical fiber 51 ranges between 10 microns to 150 microns, and the core 52 may comprise a flexible, transparent, extruded glass (silica) or plastic.

In the preferred embodiment (FIGS. 2-3), the optical fiber 51 will include a transparent core 52 surrounded by a transparent cladding 53 material with a lower index of refraction than that of the core 52. As such, the light passing from said proximal 55 and distal 56 ends is kept in the core 52 by total internal reflection, where the angles of reflection are never great enough to cause the light to exit the core 52. This enables the imaging lens 21 to conform to the shape of the eye while still passing light from its proximal end 55 to its distal end 56. The cladding material 53 may comprise a flexible, transparent glass (silica) or plastic.

In an alternative embodiment, (FIGS. 4-5), the optical fiber 51 further comprises a series of optical fiber segments 54 positioned adjacent to one another. Each segment 54 is configured to magnify an image 22, reduce an image 22, or maintain the image 22 size and quality. In this embodiment, no cladding material 53 is used to retain the light within the optical fiber 51. Instead, each segment 54 is adhered to one another through an adhesive or other mechanical means alternating to form a curved composite gradient index (GRIN) lens array 61. In the preferred embodiment, an optical adhesive will be used. In an alternative embodiment, glass fusion bonding will be used to adhere the lenses 61 together. If the regular GRIN lens 61 is straight, then flexible optical fiber 51 is used to create the curvature on the composite GRIN lens 61. Furthermore, one or a plurality of optical fibers 51 or lens arrays 61 may combined to form an optical fiber array. The diameter of the optical fiber 51 in this embodiment ranges from 10 microns to 150 microns.

Figure 7:
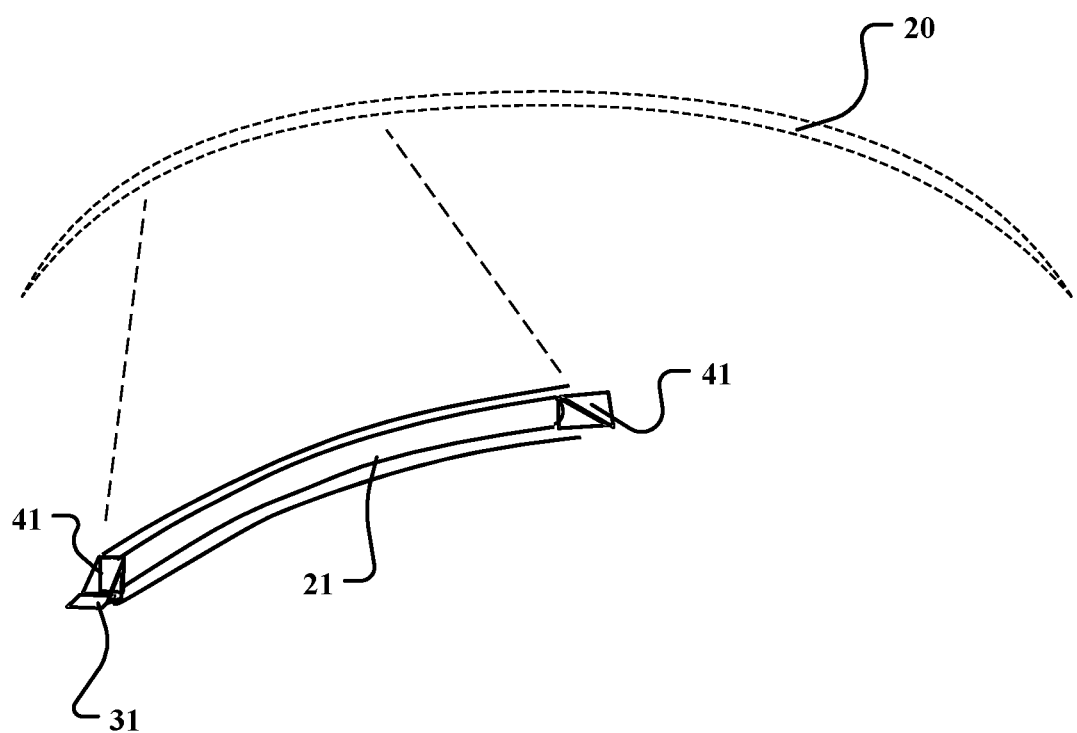
FIG. 7 is a diagram illustrating a detailed view of the cross-sectional view of FIG. 1 with a prism and display projector.

FIGS. 6-7 illustrates the method of redirecting the light into the retina 23 for both optical fiber 51 embodiments. Here, a display projector 31 will display an image or series of images 22 into a first prism 41. The display projector 31 can be any projector chip such as an LCD, LED, or OLED display optically connected to the first prism 41. This display projector 31 and first prism 41 will be outside of the viewing area of the contact lens 20. As the projected image 22 passes through the imaging lens 21, it will reach a second prism 41, where the image 22 will be projected onto the retina 23. In an alternative embodiment, the optical fiber 51 or lens array 61 may have proximal and distal ends where, instead of first and second prisms 41, they will be cut or formed to have an edge configured to project an image 22 inward.

The first step during manufacturing the present invention comprises creating the imaging lens 21. In the preferred embodiment, continuous pieces of optical fiber 51 are used with cladding 53. In an alternative embodiment, a plurality of imaging lenses 21 are positioned adjacent to one another. A prism 41 is positioned on the proximal 24 and distal ends 25 of the imaging lens 21, where a display projector 31 will be optically connected to the first prism 41. In the preferred embodiment, the imaging lens 21, prisms 41, and display projector 31 are adapted to withstand high temperatures commensurate with the imaging material curing process below.

Once the imaging lens 21 is created, it can be integrated into the imaging contact lens material. Specifically, it is placed directly into a contact lens mold member, preferably the female mold member, or first (anterior) contact lens mold member. The placement would occur preferably robotically and be coupled with a means of centering the assembly and a means of controlling the depth of the assembly during the filling of the mold with a lens precursor material, which can be understood to be a polymerizable silicone hydrogel lens precursor composition. The polymerizable silicone hydrogel lens precursor composition may be understood to be a pre-polymerized or pre-cured composition suitable for polymerization. In alternative embodiments, the lens precursor material may be comprised of silicone, hydrogel, polyimide, kapton, parylene, or SU-8. Non-stretchable lens precursor materials comprise metals, ceramics, and crystals.

The first contact lens mold member is placed in contact with a second contact lens mold member to form a contact lens mold having a contact lens shaped cavity. Next, the two contact lens mold members are placed in contact with one another to form a contact lens shaped cavity, with the polymerizable silicone hydrogel lens precursor composition and imaging lens positioned within the contact lens shaped cavity. The polymerizable silicone hydrogel lens precursor composition is then cured to form a pre-extracted polymerized silicone hydrogel contact lens product. The contact lens mold is then demolded, where contact lens product is then separated from the contact lens mold members, or delensed. After delensing, the pre-extracted silicone hydrogel contact lens product is extracted. After extraction, the extracted polymerized silicone hydrogel contact lens product is hydrated with water or an aqueous solution to form a hydrated silicone hydrogel contact lens.

In view of the above, it can be understood that the pre-extracted polymerized silicone hydrogel contact lens products and the extracted polymerized silicone hydrogel contact lens products are water swellable products or elements, and that the hydrated silicone hydrogel contact lens is a product or element swollen with water. As used herein, a silicone hydrogel contact lens refers to a silicone hydrogel element that has undergone a hydration step. Thus, a silicone hydrogel contact lens can be understood to be a fully hydrated silicone hydrogel contact lens, a partially hydrated silicone hydro gel contact lens, or a dehydrated silicone hydrogel contact lens. A dehydrated silicone hydrogel contact lens refers to a contact lens that has undergone a hydration procedure and has subsequently been dehydrated to remove water from the lens.

After hydrating the extracted silicone hydrogel contact lens product to produce a silicone hydrogel contact lens 20, the imaging lens 21 will be embedded within and ready for use. The imaging lens 21 may be used by activating the display projector 31 within the contact lens 20. Next, the method includes a step of packaging the silicone hydrogel contact lens 20. For example, the silicone hydrogel contact lens can be placed in a blister pack or other suitable container that includes a volume of a liquid, such as a saline solution, including buffered saline solutions. The stretchable polymer will generally have a curved or hemispherical shape.

While the above description contains specific details regarding certain elements, sizes, and other teachings, it is understood that embodiments of the invention or any combination of them may be practiced without these specific details. Specifically, although certain materials and shapes are designated in the above embodiments, any suitable materials or shape may be used. These details should not be construed as limitations on the scope of any embodiment, but merely as exemplifications of the presently preferred embodiments. In other instances, well known structures, elements, and techniques have not been shown to clearly explain the details of the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An imaging device comprising:
    an imaging lens configured to transmit light from a proximal end to a distal end, said imaging lens further comprising a plurality of optical fiber segments interconnected and positioned end-to-end to one another;
    a first prism optically connected to the proximal end of said imaging lens;
    a second prism optically connected to the distal end of said imaging lens; and
    a display projector optically connected to said first prism;
    wherein said plurality of optical fiber segments alternate between straight and curved segments;
    wherein said imaging lens is incorporated within a contact lens; and
    wherein said imaging lens transmits light from said display projector and first prism to said second prism, which redirects said light onto the retina of the user.

2. The imaging device of claim 1, wherein said imaging lens comprises a self-focusing flat-end gradient optical lens further comprising optical fiber.

3. The imaging device of claim 2, wherein said optical fiber further comprises an optical core and transparent cladding surrounding said optical core, said transparent cladding further comprising a lower index of refraction than that of the core, wherein said transparent cladding is configured to reflect said light within the core by total internal reflection, where the angles of reflection are never great enough to cause the light to exit said core.

4. The imaging device of claim 1, wherein said optical fiber segments are rigid.

5. The imaging device of claim 1, wherein said optical fiber segments are flexible.

6. The imaging device of claim 1, wherein said optical fiber segments are configured to magnify or reduce an image.

7. The imaging device of claim 1, wherein said display projector is an LCD, LED, or OLED display projector.

8. The imaging device of claim 1, wherein said imaging lens is configured to focus a projected image, enlarge said image, and redirect said image into the field of view of the user.

\* \* \* \* \*